US010008104B2

(12) United States Patent
Cojocaru

(10) Patent No.: US 10,008,104 B2
(45) Date of Patent: Jun. 26, 2018

(54) SECURITY SYSTEM OUTPUT INTERFACE WITH OVERLOAD DETECTION AND PROTECTION

(71) Applicant: Tyco Safety Products Canada Ltd., Concord (CA)

(72) Inventor: Aurel Cojocaru, Mississauga (CA)

(73) Assignee: Tyco Safety Products Canada Ltd., Concord (CA)

( * ) Notice: Subject to any disclaimer, the term of this patent is extended or adjusted under 35 U.S.C. 154(b) by 519 days.

(21) Appl. No.: 14/693,185

(22) Filed: Apr. 22, 2015

(65) Prior Publication Data

US 2015/0311694 A1 Oct. 29, 2015

Related U.S. Application Data

(60) Provisional application No. 61/984,066, filed on Apr. 25, 2014, provisional application No. 61/985,636, filed on Apr. 29, 2014.

(51) Int. Cl.

| | |
|---|---|
| ***H02H 3/00*** | (2006.01) |
| ***G08B 29/18*** | (2006.01) |
| ***G08B 29/06*** | (2006.01) |
| ***G08B 29/10*** | (2006.01) |

(52) U.S. Cl.
CPC ............ *G08B 29/18* (2013.01); *G08B 29/06* (2013.01); *G08B 29/10* (2013.01)

(58) Field of Classification Search
CPC ...................................................... G08B 29/18
USPC ........................................................... 361/86
See application file for complete search history.

(56) References Cited

U.S. PATENT DOCUMENTS

| | | | | |
|---|---|---|---|---|
| 4,745,398 | A * | 5/1988 | Abel | G08B 23/00 340/500 |
| 6,625,741 | B1 * | 9/2003 | Post | G07B 17/00733 340/693.2 |
| 6,952,777 | B1 * | 10/2005 | Post | G07B 17/00733 709/218 |
| 8,478,450 | B2 * | 7/2013 | Lu | H04L 12/2807 361/104 |
| 8,891,217 | B2 | 11/2014 | Bucsa et al. | |
| 9,335,232 | B2 * | 5/2016 | Scheucher | G01M 3/002 |

* cited by examiner

*Primary Examiner* — Stephen W Jackson
(74) *Attorney, Agent, or Firm* — HoustonHogle LLP

(57) ABSTRACT

An output interface circuit for a security panel. The output interface circuit includes an output switch for activating one or more output devices in response to a control signal from a port controller. The output interface circuit also includes an overload detection circuit for deactivating the one or more output devices in response to determining that a magnitude of a voltage associated with the one or more output devices exceeds an overload threshold voltage. The overload detection circuit comprises a protection switch for rendering the output switch non or less conductive thereby preventing damage to the output switch and possibly deactivating the one or more output devices when the voltage associated with the one or more output devices exceeds the overload threshold voltage.

25 Claims, 5 Drawing Sheets

SECURITY SYSTEM OUTPUT INTERFACE WITH OVERLOAD DETECTION AND PROTECTION

RELATED APPLICATIONS

This application claims the benefit under 35 U.S.C. § 119(e) of U.S. Provisional Application Ser. No. 61/985,636, filed on Apr. 29, 2014, and U.S. Provisional Application Ser. No. 61/984,066, filed on Apr. 25, 2014, which are incorporated herein by reference in their entirety.

BACKGROUND OF THE INVENTION

A security system typically includes a security panel. The security panel includes an input/output (I/O) interface circuit for monitoring sensor circuits and controlling output circuits. The I/O interface circuit can include input interface circuits and output interface circuits.

Each input interface circuit monitors a sensor circuit. The sensor circuit can include a number of sensors that detect the same or different alarm conditions. Possible alarm conditions include opening of doors (door contact sensor/relay), excessive temperatures (heat sensor), motion (motion sensor), smoke (smoke sensor), and the like. The sensor circuit sends these alarm conditions (e.g., binary conditions or measured parameters) to the input interface circuit via an electrical connection such as one or more wires.

Each output interface circuit drives an output circuit. The output circuit can include one or more output devices to be activated on the occurrence of alarm conditions. Possible output devices may include sirens, lamps, relays, strobes, and the like. The output interface circuit controls each output device via a direct electrical (wire) connection between the output circuit and the output interface circuit.

Input and output requirements for the I/O interface circuit can vary from system to system, depending on system configuration, and particularly on the number of sensors and output devices. Some systems may have a large number of sensors but relatively few output devices thus requiring a larger number of input interface circuits as compared to output interface circuits. Other systems may have relatively few sensors but numerous output devices thus requiring a larger number of output interface circuits as compared to input interface circuits.

Driving the output circuit with the output interface circuit of a security panel can cause circuit damage to components of the output interface circuit. Damage can also arise when the output circuits and/or wire is compromised or ages. The circuit damage is due to overloading/overheating of the components. In particular, the circuit damage can occur from overloading conditions (e.g., power, current, and/or voltage levels exceed catalog limits for one or more components within the output interface circuit). Overloading conditions can be the result of an installer improperly connecting wires between the output circuit and output interface circuit, a faulty output device being used, wiring being damaged, or an old or damaged output device being used.

U.S. Pat. No. 8,891,217, incorporated in its entirety herein, provides one solution to the overloading problem. This publication generally describes an I/O interface circuit that monitors for overpower conditions based on power dissipation. In particular, the publication describes using a processing unit to monitor approximate power dissipated based on a measured voltage within the I/O interface circuit. If the measured voltage is indicative of excess power dissipation, one or more logic gates are used by the I/O interface circuit to prevent current flow. By preventing current flow, circuit damage due to excess power can be avoided.

SUMMARY OF THE INVENTION

The above solution exhibits some shortcomings. In particular, the solution relies on a complex logic design that is typically implemented via software. Thus, this logic design requires a higher level of complexity for the circuit and a longer development time.

Accordingly, there is a need for an improved I/O interface circuit. There is a need for an output interface circuit having an output protection circuit for protecting against overloading conditions. Also, there is a need for an output protection circuit configured to function differently in overloading conditions from the way it functions in normal conditions.

The present invention is directed toward solutions to address these needs. The present invention offers an output interface circuit having an output protection circuit that includes an overload detection circuit. The present invention provides a simple and efficient output protection circuit for protecting output interface circuit components from being damaged by overloading conditions (e.g., short circuits and fault conditions).

In general, according to one aspect, the invention features an output interface circuit for a security panel. The output interface circuit includes an output switch for activating one or more output devices in response to a control signal from a port controller. The output interface circuit also includes an overload detection circuit for deactivating the one or more output devices in response to determining that a magnitude of a voltage associated with the one or more output devices exceeds an overload threshold voltage.

Preferably, the magnitude of the voltage associated with the one or more output devices is measured near an output port.

Typically, the overload threshold voltage corresponds with overloading conditions. In one embodiment, the overload detection circuit includes a voltage divider for defining the overload threshold voltage.

In embodiments, the overload detection circuit includes a protection switch. When the voltage associated with the one or more output devices exceeds the overload threshold voltage, the protection switch renders the output switch non- or less conductive which deactivates the one or more output devices or at least restricts the power to non-damaging levels.

In one example, the overload detection circuit has a diode. When the voltage associated with the one or more output devices exceeds the overload threshold voltage, the diode is forward-biased rendering the protection switch conductive by the control signal. The overload detection circuit also includes a delay stage. The delay stage postpones the control signal of the port controller from rendering the protection switch conductive until after the output switch is rendered conductive. The delay stage is a capacitor in a current embodiment.

The output switch is preferably an output transistor. The protection switch is preferably a protection transistor.

In general, according to another aspect, the invention features a security system that includes an output circuit for providing power to an output device. The security system includes a security panel. The security panel includes a port controller for controlling an output port with a control signal. Also, the security panel has an output interface circuit for receiving a control signal from the port controller. The output interface circuit has an output switch for activating one or more output devices in response to the control signal of the port controller. Also, the output interface circuit has an overload detection circuit for deactivating the one or more output devices in response to determining that a magnitude of a voltage associated with the one or more output devices exceeds an overload threshold voltage.

In general, according to one aspect, the invention features a method of using an output interface circuit for a security panel. An output switch activates one or more output devices in response to a control signal from a port controller. An overload detection circuit determines that a magnitude of a voltage associated with the one or more output devices exceeds an overload threshold voltage. The overload detection circuit deactivates the one or more output devices in response to determining that the magnitude of the voltage associated with the output devices exceeds the overload threshold voltage.

In one embodiment, the overload detection circuit includes a voltage divider for defining the overload threshold voltage and determining that the magnitude of the voltage associated with the one or more output devices exceeds the overload threshold voltage.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element. The existence of intervening elements is not precluded, however.

Figure 1:
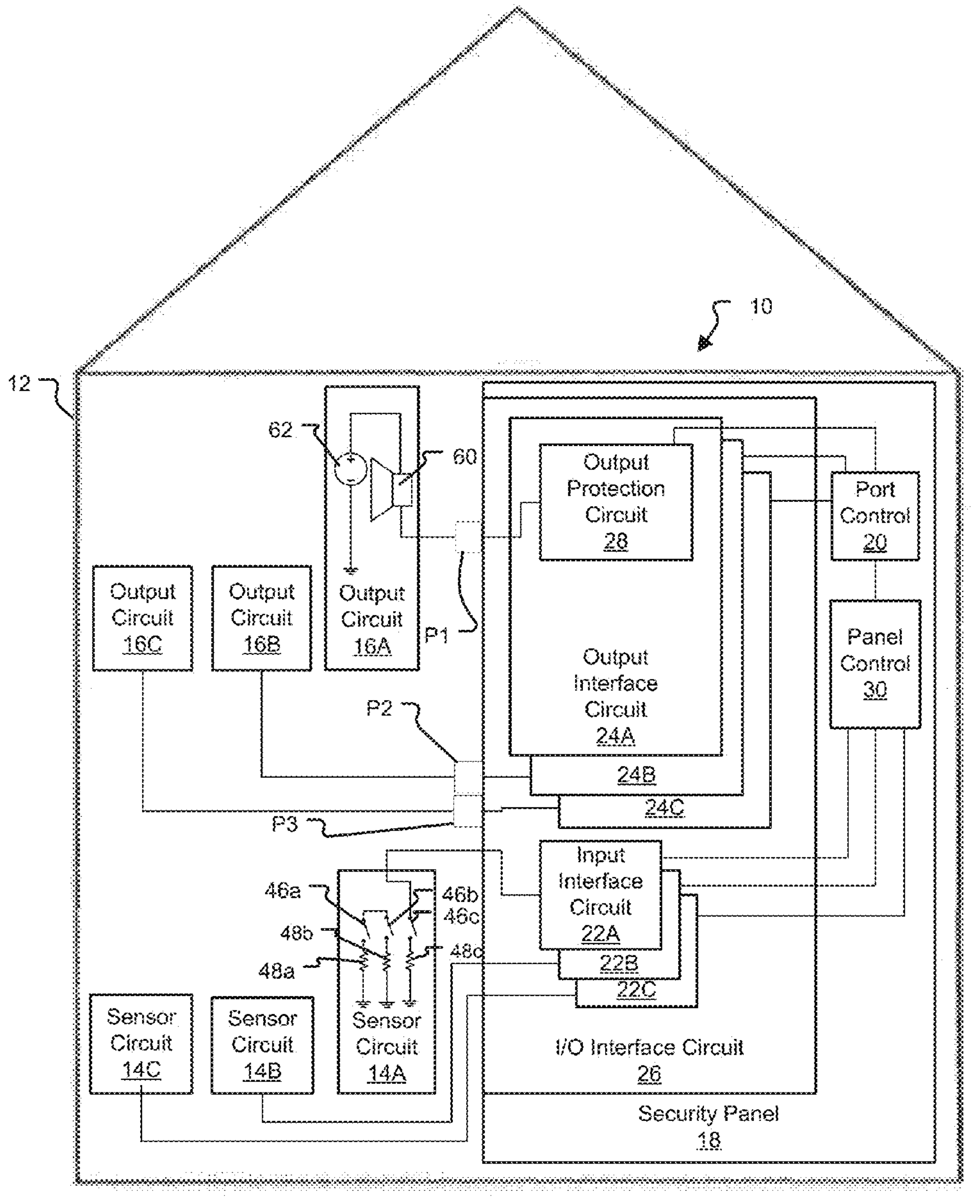
FIG. 1 is a schematic diagram of a security system.

FIG. 1 depicts a security system 10, to which embodiments of the invention are applicable. The security system 10 is installed at a premises 12. For example, the premises 12 may be an office or governmental building, school, hospital, factory, train station, airport terminal, or other public or private building.

The security system 10 includes a security panel 18. The security panel 18 provides system control and system supervision of sensors and output devices. The security panel 18 communicates status information regarding the sensors and output devices (e.g., alarm conditions and fault conditions) to a monitoring station. Fault conditions can include low battery, AC loss, etc.

The security panel 18 includes an input output (I/O) interface circuit 26. The I/O interface circuit 26 includes input interface circuits 22A, 22B, 22C (individually and collectively, input interface circuits 22) and output interface circuits 24A, 24B, 24C (individually and collectively, output interface circuits 24). The depicted I/O interface circuit 26 includes three input interface circuits 22A, 22B, 22C and three output interface circuits 24A, 24B, 24C. However, the I/O interface circuit 26 may include any number of such input interface circuits 22 or output interface circuits 24 (e.g. 1, 8, 16 or 32) as required by the security system 10. The input interface circuits 22 and output interface circuits 24 can be physically together. For example, input interface circuits 22 and output interface circuits 24 can be configured in the same port location by selecting the character of the port (input or output) via software as in U.S. Pat. No. 8,891,217.

Each input interface circuit 22A, 22B, 22C is wired to at least one input circuit, such as a sensor circuit 14A, 14B, 14C. The sensor circuit 14A, 14B, 14C often includes at least one sensor. In one implementation, each sensor circuit 14A, 14B, 14C has at least one sensor resistor. For example, an illustrated sensor circuit 14A has three sensor resistors 48*a*, 48*b*, 48*c* (individually and collectively, sensor resistors 48). The value of each sensor resistor 48A, 48*b*, 48*c* represents a specific resistive state for the sensor circuit 14A. Each resistive state corresponds to a particular alarm condition. The resistive state may correspond to, for example, TAMPER, ALARM, RESTORE, ANTIMASKING and/or other alarm or status conditions. The sensor resistors 48*a*, 48*b*, 48*c* are in series with sensor switches 46*a*, 46*b*, 46*c* (individually and collectively, sensor switches 46) such that that the sensor switches 46 may open or close in response to a sensed alarm condition (e.g., an opened door or window, the presence of smoke, motion, or the like). For example, the sensor circuit 14A includes an open door sensor/relay that is wired to sensor resistor 48*a*. When a door is opened (as sensed by the open door sensor), the open door sensor directs the sensor switch 46*a* to close. As required, the sensor circuit 14A can include further components (not shown) to detect and react to a particular alarm condition. Conveniently, the example sensor circuit 14A can interconnect several sensors to one input interface circuit 22A of the I/O interface circuit 26. Resistances of sensor resistors 48*a*, 48*b*, 48*c* may be different, and may be selected such that each permutation of the tripped sensors in the sensor circuit 14A yields a different total resistance, that may be sensed at the security panel 18. The total resistance of each sensor circuit 14A, 14B, 14C is indicative of which sensors on each sensor circuit 14A, 14B, 14C are active. Not all the sensors will have a normally open contact, however. Some may use a normally closed contact that, upon the activation of the door opening, for example, will open the relay contact. There are many options regarding the sensor's contact configuration as will be appreciated by one skilled in the art.

The security panel 18 includes a panel controller 30. The panel controller 30 is dedicated to monitoring the sensor circuits 14A, 14B, 14C (particularly the sensors) via the input interface circuits 22A, 22B, 22C. The panel controller 30 is wired individually to each input interface circuit 22A, 22B, 22C to sense alarm conditions for each sensor circuit 14A, 14B, 14C, respectively. The panel controller 30 can be configured as a programmable controller or processor having multiple I/O pins each for receiving electrical signals from the input interface circuits 22A, 22B, 22C. The total resistance of each sensor circuit 14A, 14B, 14C is monitored by the panel controller 30 via each input interface circuit 22A, 22B, 22C. The panel controller 30 identifies the existence of alarm conditions based on these total resistances (i.e., indicative of which sensors are activated). In contrast from wired connections, the panel controller 30 can also wirelessly monitor the sensor circuits 14A, 14B, 14C. For example, the sensor circuits 14A, 14B, 14C (i.e., sensors) communicate with the panel controller 30 via radio frequency wireless communication. In this wireless example, the sensor circuits 14A, 14B, 14C (i.e., sensors) are individually enrolled so that each sensor circuit 14A, 14B, 14C has a dedicated "address" that is recognized by the panel controller 30.

The panel controller 30 can include, or be associated with a suitable combination of persistent and random access memory to allow the panel controller 30 to be programmed to operate as described herein. The panel controller 30 may be part of another processor used to control the overall operation of the security panel 18.

Each output interface circuit 24A, 24B, 24C is wired to at least one output circuit 16A, 16B, 16C. In one example, the output circuit 16A includes an output device 60 (i.e., electrical load—e.g., 140 ohm resistive load) that is actuated by the security panel 18. The output device 60 may be a strobe light, a siren, an audio transducer or piezo, a light, a relay, or the like.

The output device 60 is activated under control of the security panel 18. The output circuit 16A can include its own source of electrical power, in the form of a separate power source 62, or a shared power source could be used. As such, power to the output device 60 need not be provided by the security panel 18. The output device 60 is usually powered from a different, many times external, power supply than the rest of the circuit. In one example, the power source 62 provides +14 V DC supply. Other power sources may be used as appreciated by one of skill in the art.

The security panel 18 includes a port controller 20. The port controller 20 is dedicated to controlling output circuits 16A, 16B, 16C (particularly the output devices 60) via the output interface circuits 24A, 24B, 24C. The port controller 20 is wired individually to each output interface circuit 24A, 24B, 24C to control each output interface circuit 24A, 24B, 24C, separately. The port controller 20 can be configured as a programmable controller or processor having multiple I/O pins each for sending control signals to the output interface circuits 24A, 24B, 24C. The port controller 20 generates a control signal to actuate the output device 60 of each output circuit 16A, 16B, 16C via each output interface circuit 22A, 22B, 22C. The port controller 20 can include, or be associated with a suitable combination of persistent and random access memory to allow the port controller 20 to be programmed to operate as described herein. The port controller 20 may be part of another processor used to control the overall operation of the security panel 18. In one example, the port controller 20 is an output port switching device. In another example, the port controller 20 is a microprocessor or an output stage of an electronic device (e.g., digital electronic circuitry).

The port controller 20 is slaved to the panel controller 30. This allows the panel controller 30 to communicate actions to be taken by the output ports based on the alarm and system's status conditions. These actions include alarm signals (corresponding with particular alarm conditions) that are communicated to the port controller 20. Thus, the panel controller 30 can direct the port controller 20 when there is a particular alarm condition relating to one of the sensor circuits 14A, 14B, 14C. Then, the port controller 20 can activate the relevant output circuit 16A, 16B, 16C (particularly the output device 60) upon receiving the action, e.g., alarm signal corresponding with the particular alarm condition, from the panel controller 30. For example, the port controller 20 may actuate a lamp to be turned on if a particular sensor circuit 14A, 14B, 14C is tripped. Alternatively, the port controller 20 may switch a relay which controls a thermostat, or may cause an overhead door to close when a sensor circuit 14A, 14B, 14C is tripped.

The security system 10 includes ports P1, P2, P3. Each port P1, P2, P3 supports the wiring connections between the output interface circuit 24A, 24B, 24C and the output circuit 16A, 16B, 16C, respectively. These ports P1, P2, P3 are controlled by the port controller 20 (e.g., port controller 20 controls the states to be taken by ports P1, P2, P3 based on actions received from the panel controller 30.

As described above, circuit damage can occur within the output interface circuit 24 from overloading conditions. These overloading conditions can be the result of a fault condition. The fault condition may be due to improperly wiring the output circuit 16 to the output interface circuit 24, installing a faulty output device 60, damage to the wiring or output device, or installing an old damaged output device 60.

Output protection circuits address this overloading problem. As shown in FIG. 1, it is relatively common for the output protection circuit 28 to be incorporated into the output interface circuit 24 for preventing damage from overloading conditions.

Figure 2:
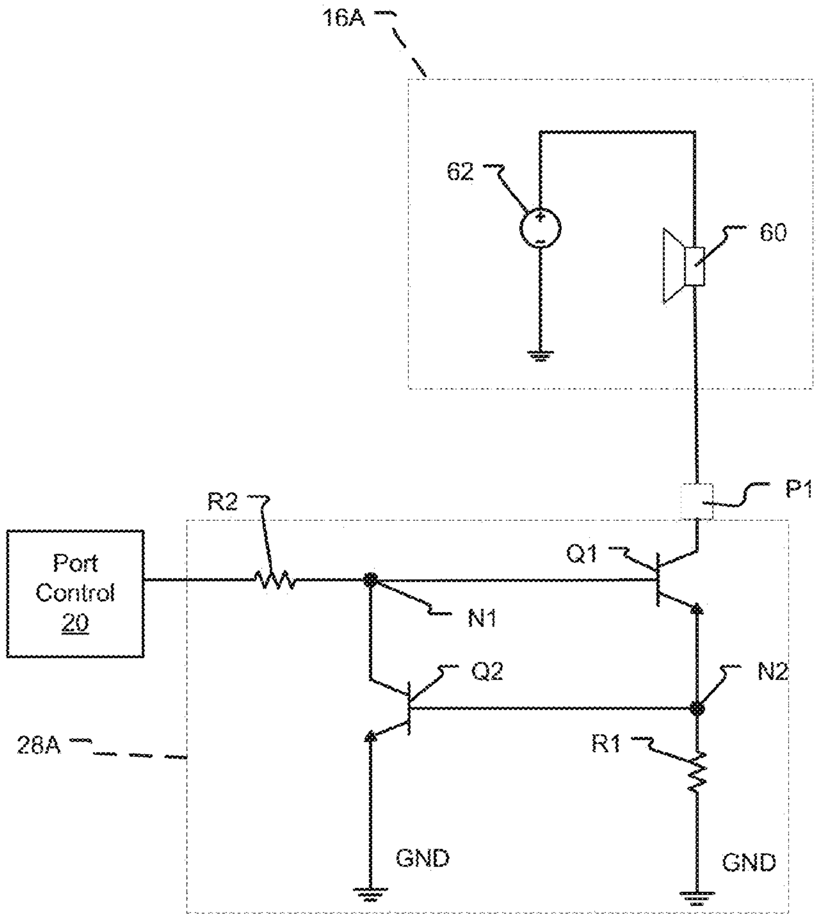
PRIOR ART FIG. 2
FIG. 2 is a circuit diagram of a prior art output protection circuit.

FIG. 2 illustrates an example prior art output protection circuit 28A for an output interface circuit 24. This prior art output protection circuit 28A generally limits the amount of current passing through the output interface circuit 24 from the output circuit 16A.

The port controller 20 directs activation of the output device 60 via a control signal for activating the output device 60 within the output circuit 16A. The control signal is generally a high voltage (i.e., logic level high) for activation of the output device 60 and generally a low voltage (i.e., logic level low) for deactivation of the output device 60.

In general, the port controller 20 controls the operation of an output transistor Q1. A voltage applied to the base of the output transistor Q1 is responsible for controlling whether the output transistor Q1 is rendered conductive or rendered non- or less conductive. The output transistor Q1 is rendered conductive when a base voltage of the output transistor Q1 is greater than an emitter voltage by an output base threshold voltage. The output transistor Q1 is rendered non- or less conductive when the base voltage is less than the emitter voltage by the output base threshold voltage. This output base threshold voltage is typically about 0.6 V (for silicon based devices). When the control signal is a high voltage (control signal voltage is higher than the output base threshold voltage), the output transistor Q1 is rendered conductive ("on"). Thus, the output circuit 16A is active. Current flows from the power supply 62 to the output device 60, and passes through the output transistor Q1 and the current sense resistor R1 (i.e., output device 60 is activated).

The prior art output protection circuit 28A includes an output base resistor R2 wired between the port controller 20 and the base of the output transistor Q1 such that the output base resistor R2 limits current (below damaging levels) into the base of the output transistor Q1. The value of the output base resistor R2 is large enough to limit current flow but small enough to provide enough current so that the output transistor Q1 can be rendered conductive by the port controller 20.

Similar to the output transistor Q1, a protection transistor Q2 is controlled by a base threshold voltage such as a protection base threshold voltage. The level of the voltage at the base of the protection transistor Q2 is determined by the voltage across the current sense resistor R1 (i.e., voltage at the voltage threshold sensing node N2). In particular, the base of the protection transistor Q2 is controlled by the current flowing through the output transistor Q1 and current sense resistor R1 as well as the resistive value of the current sense resistor R1. When the voltage at the base of the protection transistor Q2 is higher than the protection base threshold voltage, the protection transistor Q2 is rendered conductive. For example, when the voltage at the voltage threshold sensing node N2 (i.e., voltage at base of protection transistor Q2) is smaller than the protection base threshold voltage (e.g., 0.6 V), the protection transistor Q2 is rendered non- or less conductive ("off"). Alternatively, when the voltage at the voltage threshold sensing node N2 (i.e., voltage at base of the protection transistor Q2) is greater than the protection base threshold voltage (e.g., 0.6 V) or about equal to the protection base threshold voltage (e.g., 0.6 V), the protection transistor Q2 is rendered conductive ("on").

When the protection transistor Q2 is rendered conductive ("on"), current is pulled from the protection node N1. The protection node N1 leads directly into the base of the output transistor Q1. Thus, the base voltage of the output transistor Q1 is lowered thus limiting the amount of current passing through the output transistor Q1 to the value Ilim=0.6V/R1. When the base voltage of the output transistor Q1 reaches a value below the output base threshold voltage, the output transistor Q1 is rendered non- or less conductive ("off"). Thus, the current path between the output device 62 and ground is limited or possibly interrupted. In particular, the current through the output transistor Q1 is limited to a current limit (Ilim) of about 0.6V/R1. When the protection transistor Q2 pulls the voltage of the base of the output transistor Q1 down low, the output transistor Q1 tends to lower the current going through the output device 60 which lowers the voltage drop across the current sense resistor R1 thus deactivating the effect of the protection transistor Q2 on the base of the output transistor Q1.

This prior art output protection circuit 28A protects the circuit from being damaged by certain overloading conditions. In particular, the prior art output protection circuit 28A opens the output circuit 16A in response to overloading conditions based on the voltage at voltage threshold sensing node N2 (i.e., limits current). When the overloading conditions occur, the voltage at the voltage threshold sensing node N2 increases to a voltage level greater than the protection base threshold voltage rendering the protection transistor Q2 conductive ("on") which renders the output transistor Q1 non- or less conductive ("off"). Thus, the output circuit 16A is opened which prevents current from flowing from the power source 62 to the output device 60. Specifically, the current flowing through the output circuit 16A is limited to a predetermined value.

The above prior art solution exhibits some shortcomings, however. The prior art output protection circuit 28A is not able to protect itself from being damaged by overloading conditions (e.g., a sheer short circuit or a higher value load) at the output device 60. In particular, the prior art output protection circuit 28A does not respond to damaging power levels (i.e., combination of current and voltage) at the output transistor Q1. When this overloading condition occurs in the prior art output protection circuit 28A, the voltage at the collector of the output transistor Q1 rises to near or higher than the control signal from the port controller 20. In spite of the collector current for the output transistor Q1 being limited, the power dissipation (i.e., voltage multiplied by current) of the output transistor Q1 can easily exceed the maximum catalog value, therefore destroying the output transistor Q1. When the output device 60 (i.e., output device load) is short circuited, the load current is limited to a predetermined value. The power dissipation of the output transistor Q1 is the value of this predetermined current value multiplied by the value of the voltage of the power supply 62. Thus, this short-circuit event typically damages the output transistor Q1 by exceeding an accepted power dissipation range (i.e., catalog power dissipation) for the output transistor Q1.

Figure 3:
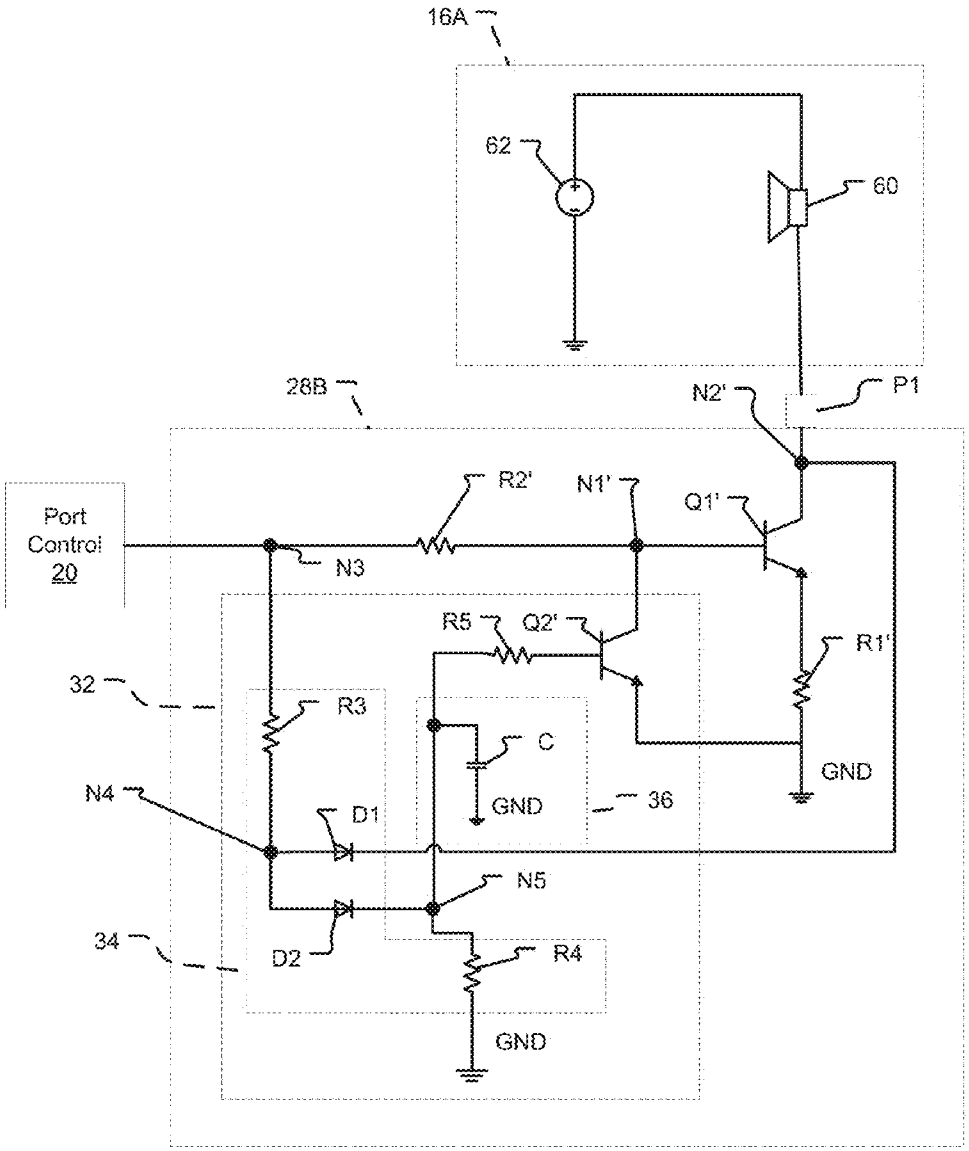
FIG. 3 is a circuit diagram of an output protection circuit according to an embodiment of the present invention.

FIG. 3 shows an output protection circuit 28B that has been constructed according to the principles of the present invention and provides a solution to the problem identified with the prior art output protection circuit 28A.

The output protection circuit 28B includes an output switch Q1' that activates and deactivates the output circuit 16A. In the illustrated embodiment, the output switch Q1' is implemented as a transistor and specifically an NPN BJT transistor, although other transistor types could be used such as a field-effect transistor (FET) or an insulated-gate bipolar transistor (IGBT), to list some other examples.

In general, BJTs include the following three terminals: emitter, base, and collector. The base is responsible for controlling whether the BJT switch is open or closed. For example, the NPN BJT switch is rendered conductive (i.e., closed, "on", or saturated) when the base voltage is greater than the emitter voltage by a base threshold voltage. The NPN BJT switch is rendered non- or less conductive (i.e., reduced conductive state, open, "off", or cutoff) when the base voltage is less than the emitter voltage. This base threshold voltage is typically about 0.6 V.

For example, the NPN BJT works in a saturation condition (ON) and a blocking/cut-off (OFF) condition. The NPN BJT can also work in the active area where a base-emitter junction is forward biased and the base-collector junction is reverse biased. Most NPN BJTs are designed to afford the greatest common-emitter current gain, βF, in forward-active mode. If this is the case, the collector-emitter current is approximately proportional to the base current, but many times larger, for small base current variations. The common-emitter current gain is represented by βF or h-parameter hFE; it is approximately the ratio of the DC collector current to the DC base current in forward-active region. It is usually much greater than one, typically 50 to 200 depending on the transistor and the collector current.

The output transistor switch Q1' selectively connects the output circuit 16A to ground. Ideally, the output transistor switch Q1' is connected to ground but for a BJT there is a "residual" saturation voltage Vce across the emitter-collector junction. Specifically, it has a collector, also referred to as the voltage threshold sensing node N2', that is electrically connected to a port P1 of the output protection circuit 28B. The output circuit 16A is wired to this port P1. The emitter of the output transistor switch Q1' is connected to ground through a current sense resistor R1'. In one example, the current sense resistor R1' has a resistive value of 6.8 ohms. Finally, the base of the output transistor switch Q1', also referred to as protection node N1', connects to port control node N3 via output base resistor R2'. In one example, the output base resistor R2' has a resistive value of 1 k ohms.

The output protection circuit 28B includes an overload detection circuit 32. The overload detection circuit 32 is positioned between the port control node N3 and the protection node N1'. The main components of the overload detection circuit 32 are a protection switch Q2', a voltage divider 34, and a delay stage 36.

The protection switch Q2' is used to force the output transistor switch Q1' into a reduced or nonconductive state in response to overloading conditions. In the illustrated embodiment, the protection switch Q1' is implemented as a transistor and specifically another NPN BJT transistor, although other transistor types could be used here also.

The protection transistor switch Q2' selectively connects the protection node N1' to ground. Ideally, the output transistor switch Q1' is connected to ground but for a BJT there is a "residual" saturation voltage Vce across the emitter-collector junction. Specifically, it has a collector connected to the protection node N1'. The emitter of the protection transistor switch Q2' is connected to ground. Finally, the base of the protection transistor switch Q2' is connected to ground through a protection resistor R5, delay stage 36, and a lower voltage divider resistor R4. In one example, the protection resistor R5 has a resistive value of 1 k ohms.

The voltage divider 34 defines an overload threshold voltage and compares a magnitude of a voltage associated with the output device 60 to the defined overload threshold voltage. The voltage divider 34 is formed of an upper voltage divider resistor R3, the lower voltage divider resistor R4, an output diode D1, and a protection diode D2. The upper voltage divider resistor R3 is connected between the port control node N3 and a voltage divider node N4. The output diode D1 and protection diode D2 are connected to the voltage divider node N4. Specifically, the output diode D1 is connected between the voltage divider node N4 and the voltage threshold sensing node N2' whereas the protection diode D2 is connected between the voltage divider node N4 and delay input node N5. The protection diode D2 is connected to ground through the delay input node N5 and the lower voltage divider resistor R3.

The voltage divider 34 defines the overload threshold voltage (i.e., corresponds with overloading conditions) at the voltage divider node N4. This overload threshold voltage is based on a ratio for the voltage divider 34. In one example, the ratio of this voltage divider 34 is calculated such that the voltage across the lower voltage divider resistor R4 is at least equal to the protection base threshold voltage (e.g., at least 0.6 V) which is the minimum base threshold voltage for controlling the base of the protection transistor switch Q2'. The ratio for the voltage divider 34 also considers the voltage amount necessary to compensate for the voltage across the current sense resistor R1' and the collector-emitter voltage Vce that is safely permitted for the output transistor switch Q1' to function at the output device's maximum current. In one example, the upper voltage divider resistor R3 has a resistive value of 2.4 k ohms and the lower voltage divider resistor R4 has a resistive value of 1.2 k ohms.

The delay stage 36 (e.g., time delay component) delays the control signal to the protection transistor switch Q2'. The base of the protection transistor switch Q2' is connected to the delay stage 36 through a protection resistor R5. The delay stage can be implemented in the form of a capacitor C. In one example, the capacitor C has a capacitance value of 1000 picofarad capacitance. The capacitor C is connected between delay input node N5 and ground.

The output protection circuit 28B functions in normal conditions and overloading conditions. Normal conditions are defined as circuit conditions where power, current and/or voltage levels are below catalog limits for the output device 60 and/or output transistor switch Q1'. Overloading conditions are defined as circuit conditions where power, current and/or voltage levels exceed catalog limits for the output device 60 and/or output transistor switch Q1'. For example, the overloading conditions can be the result of a short circuit at the output device 60.

The output protection circuit 28B receives the control signal from the port controller 20 during normal conditions and overloading conditions. The control signal is either an inactive control signal or an active control signal. When the control signal is a low value signal (e.g., low voltage control signal—low logic), the control signal is the inactive control signal. When the control signal is a high value signal (e.g., high voltage control signal—high logic), the control signal is the active control signal. In one example, the active control signal is a 3.3 V.

When the output protection circuit 28B functions in normal conditions with the inactive control signal, the output device 60 is inactive. The output transistor switch Q1' is controlled by its output base threshold voltage. Since the inactive control signal is below the output base threshold voltage, the output transistor switch Q1' is rendered non-conductive (i.e., reduced conductive state or "off"). Thus, the output device 60 is inactive since the path between the output device 62 and ground is broken.

When the output protection circuit 28B functions in normal conditions with the active control signal, the output device 60 is active. The port controller 20 outputs the active control signal to the base of the output transistor switch Q1' via the port control node N3. Since the active control signal exceeds the output base threshold voltage of the output transistor switch Q1', the output transistor switch Q1' is rendered conductive ("on"). Thus, the output circuit 16A is closed such that current flows from the power supply 62 to the output device 60 (i.e., output device 60 is activated). In particular, the conductive output transistor switch Q1' provides a conductive path to ground from the power source 62 of the output circuit 16A through the output device 60, voltage threshold sensing node N2', output transistor switch Q1', and current sense resistor R1'. Therefore, the output device 60 is active.

In normal conditions with the active control signal, the output transistor switch Q1' is rendered conductive ("on") causing the output diode D1 to be forward-biased (i.e., current flow is permitted). When the output diode D1 is forward-biased, it causes the protection diode D2 to be reverse-biased (i.e., current flow is prohibited). The reverse-biased protection diode D2 prevents current from flowing to the protection transistor switch Q2' and rendering it conductive.

In overloading conditions with the active control signal, the voltage divider 34 determines that the output device voltage exceeds the overload threshold voltage. When overloading conditions occur, the collector voltage of the output transistor switch Q1' increases significantly thereby causing the voltage at the voltage threshold sensing node N2' (i.e., output device voltage) to exceed the overload threshold voltage. Specifically, the voltage divider 34 compares the output device voltage at the voltage threshold sensing node N2' to the overload threshold voltage at the voltage divider node N4.

When output device voltage at the voltage threshold sensing node NT is greater than the overload threshold voltage at node N4, the output protection circuit 28B deactivates the output device 60. Specifically, when the overload threshold voltage is exceeded, the protection diode D2 is forward-biased and the output diode D1 is reverse-biased. The protection diode D2 being forward-biased provides a pathway for current flow to the base of the protection transistor switch Q2'. In particular, the active control signal reaches the base of the protection transistor switch Q2' rendering the protection transistor switch Q2' conductive ("on") When the protection transistor switch Q2' is rendered conductive, current is pulled from the protection node N1' which leads directly into the base of the output transistor switch Q1'. The base voltage of the output transistor switch Q1' is decreased to a value below the output base threshold voltage which forces the output transistor switch Q1' into a reduced or nonconductive state ("off"). Thus, the output device 60 is deactivated. In particular, the path between the output device 62 and ground is interrupted (i.e., current does not flow from the power source 62 to ground through the output device 60).

In all conditions, the delay stage 36 (e.g., capacitor C) postpones or delays the control signal from rendering the protection transistor switch Q2' conductive. The delay stage 36 is able to provide a time delay with respect to the control signal. In one example, the capacitance of the capacitor C is calculated such that for the minimum switching frequency of the output device 60, the power dissipation and the pulsed maximum allowed current of the output transistor switch Q1' is not exceeded. Insertion of the delay stage 36 between the port controller 20 and the protection transistor switch Q2' allows for the output transistor switch Q1' to be rendered conductive ("on") before the protection transistor switch Q2' is rendered conductive ("on") based on the time delay. Thus, in normal conditions with the active control signal, the output transistor switch Q1' can supply power to the output device 60 and drive the collector voltage of the output transistor switch Q1' low. Without the delay stage 36, the active control signal would render the protection transistor switch Q2' conductive simultaneously with the output transistor switch Q1' being rendered conductive (i.e., presenting a contingency issue between these two transistor switches Q1', Q2').

Figure 4A:
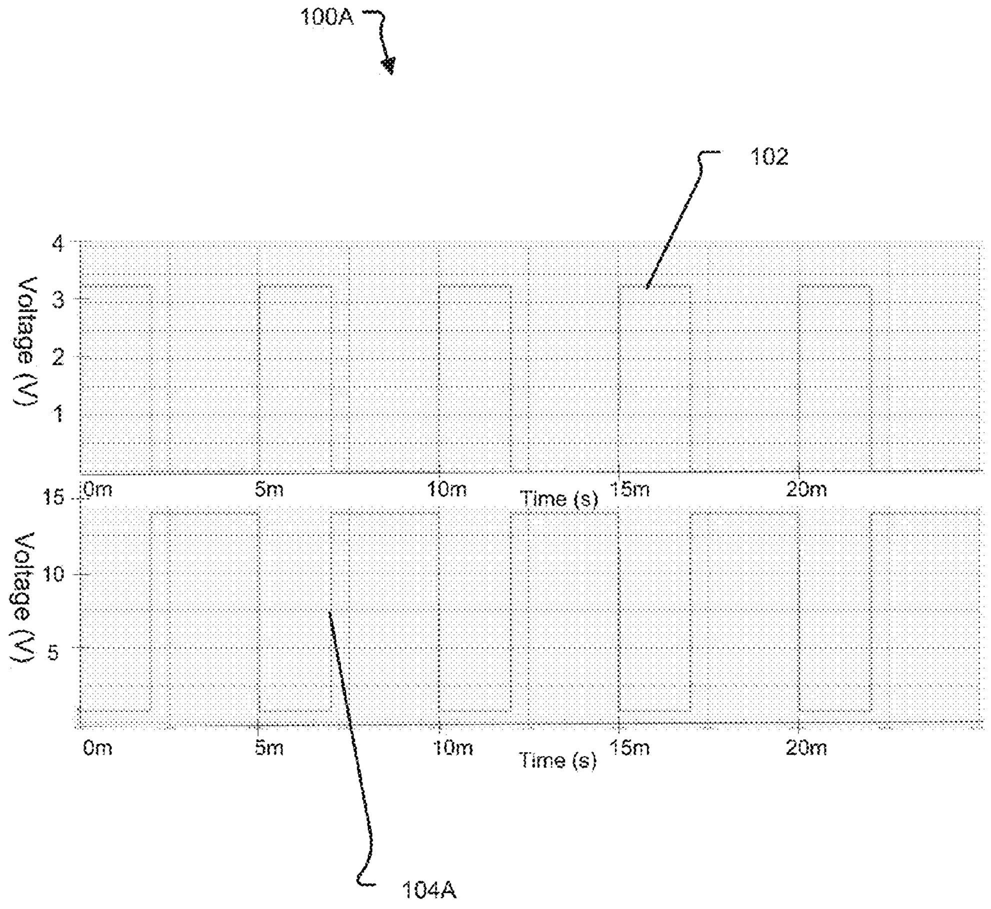
FIG. 4A has waveform plots of a control signal and an output signal as a function of time (milliseconds) for the output protection circuit of FIG. 3 in normal conditions.

FIG. 4A represents waveform plots 100A as a function of time (milliseconds) for the output protection circuit 28B in normal conditions. The upper waveform plot (red plot) is the control signal 102 generated by the port controller 20. The control signal 102 is measured at the port control node N3. The lower waveform plot (blue plot) is an output signal 104A or the voltage at the output device 60 in normal conditions. The output signal 104A is measured at the voltage threshold sensing node N2' (i.e., voltage associated with output device 60). In the illustrated example, the voltage of the control signal 102 is about 3.3 V and the voltage of the output signal 104A is about 14 V. It is noticeable that the output signal 104A follows exactly the same shape as the control signal 102. Thus, in general, no change occurs to the control signal.

Figure 4B:
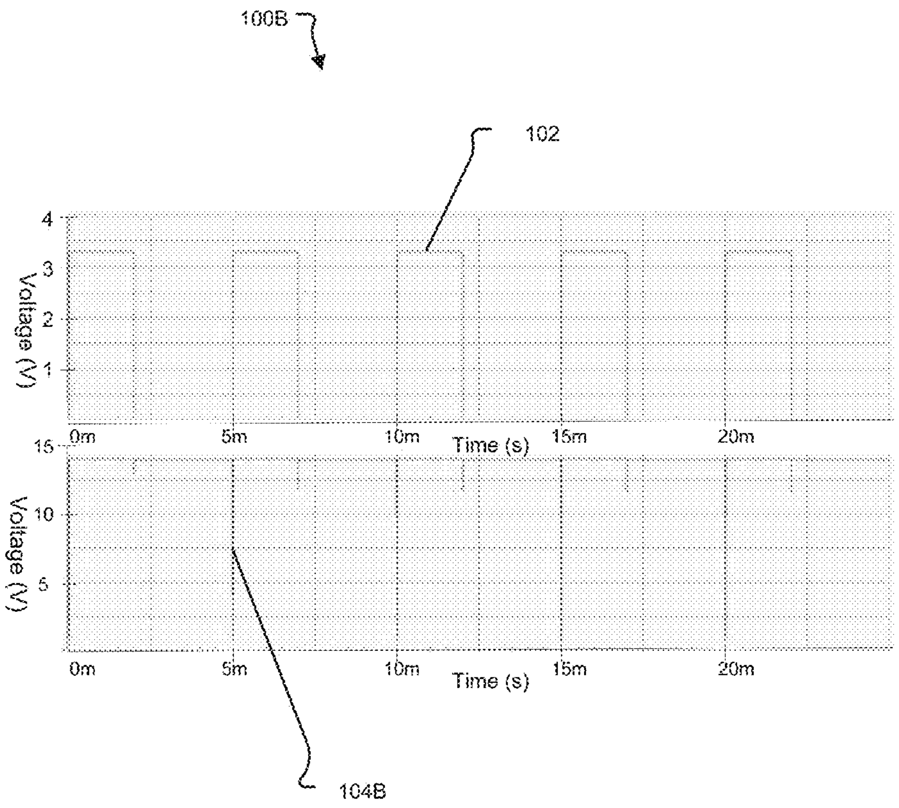
FIG. 4B has waveform plots of the control signal and the output signal as a function of time (milliseconds) for the output protection circuit of FIG. 3 in overloading conditions.

FIG. 4B represents the waveform plots 100B as a function of time (milliseconds) for the output protection circuit 28B in overloading conditions. The upper waveform plot (red plot) is the control signal 102 generated by the port controller 20. The control signal 102 is measured at the port control node N3. The lower waveform plot (blue plot) is the output signal 104B for the output device 60 in overloading conditions. The output signal 104B is measured at the voltage threshold sensing node N2' (i.e., voltage associated with output device 60). In the illustrated example, the voltage of the control signal 102 is about 3.3 V and the voltage of the output signal 104B is about 14 V. It is noticeable that the output signal 104B breaks (i.e., current stops flowing) after a short delay. This delay can be calculated based on the capabilities of the output transistor switch Q1'. The voltage break (i.e., current break) is due to the output protection circuit 28B responding to overloading conditions. In particular, the overload detection circuit 32 renders the output transistor switch Q1' non- or less conductive in response to these overloading conditions which opens the output circuit 16A preventing current flow to the output device 60. In particular, the output transistor switch Q1' only conducts for a short time during the time delay period which is to be calculated not to exceed the catalog data for the output device 60.

While this invention has been particularly shown and described with references to preferred embodiments thereof, it will be understood by those skilled in the art that various changes in form and details may be made therein without departing from the scope of the invention encompassed by the appended claims.

What is claimed is:

1. An output interface circuit for a security panel, comprising:

an output switch for activating one or more output devices in response to a control signal from a port controller; and an overload detection circuit for deactivating the one or more output devices in response to determining that a magnitude of a voltage associated with the one or more output devices exceeds an overload threshold voltage.

2. The output interface circuit according to claim 1, wherein the overload detection circuit comprises a voltage divider for defining the overload threshold voltage.

3. The output interface circuit according to claim 1, wherein the output switch is an output transistor.

4. The output interface circuit according to claim 1, wherein the overload detection circuit comprises a protection switch for rendering the output switch non or less conductive thereby preventing damage to the output switch when the voltage associated with the one or more output devices exceeds the overload threshold voltage.

5. The output interface circuit according to claim 4, wherein the protection switch is a protection transistor.

6. The output interface circuit according to claim 4, wherein the overload detection circuit comprises a diode that is forward biased when the voltage associated with the one or more output devices exceeds the overload threshold voltage rendering the protection switch conductive by the control signal.

7. The output interface circuit according to claim 4, wherein the overload detection circuit comprises a delay stage for postponing the control signal from rendering the protection switch conductive until after the output switch is rendered conductive.

8. The output interface circuit according to claim 7, wherein the delay stage is a capacitor.

9. The output interface circuit according to claim 1, wherein the overload detection circuit comprises a diode that is forward biased in normal conditions and reverse-biased in overloading conditions.

10. An output interface circuit for a security panel, comprising:

- an output switch for activating one or more output devices in response to a control signal from a port controller; and
- an overload detection circuit for deactivating the one or more output devices in response to determining that a magnitude of a voltage associated with the one or more output devices exceeds an overload threshold voltage, and wherein the overload threshold voltage corresponds with overloading conditions.

11. The output interface circuit according to claim 1, wherein the magnitude of the voltage associated with the one or more output devices is measured near an output port.

12. A security system, comprising:

- an output circuit for providing power to an output device; and
- a security panel comprising:
  - a port controller for controlling an output port with a control signal;
  - an output interface circuit for receiving a control signal from the port controller and comprising:
    - an output switch for activating one or more output devices in response to the control signal of the port controller; and
    - an overload detection circuit for deactivating the one or more output devices in response to determining that a magnitude of a voltage associated with the one or more output devices exceeds an overload threshold voltage.

13. The security system according to claim 12, wherein the overload detection circuit comprises a voltage divider for defining the overload threshold voltage.

14. The security system according to claim 12, wherein the output switch is an output transistor.

15. The security system according to claim 12, wherein the overload detection circuit comprises a protection switch for rendering the output switch nonconductive thereby deactivating the one or more output devices when the voltage associated with the one or more output devices exceeds the overload threshold voltage.

16. The security system according to claim 15, wherein the protection switch is a protection transistor.

17. The security system according to claim 15, wherein the overload detection circuit comprises a diode that is forward biased when the voltage associated with the one or more output devices exceeds the overload threshold voltage rendering the protection switch conductive by the control signal.

18. The security system according to claim 15, wherein the overload detection circuit comprises a delay stage for postponing the control signal from rendering the protection switch conductive until after the output switch is rendered conductive.

19. The security system according to claim 12, wherein the overload threshold voltage corresponds with overloading conditions.

20. A method of using an output interface circuit for a security panel, the method comprising:

- an output switch activating one or more output devices in response to a control signal from a port controller;
- an overload detection circuit determining that a magnitude of a voltage associated with the one or more output devices exceeds an overload threshold voltage; and
- the overload detection circuit deactivating the one or more output devices in response to determining that the magnitude voltage exceeds the overload threshold voltage.

21. The method according to claim 20, wherein the overload detection circuit comprises a voltage divider for defining the overload threshold voltage and determining that the magnitude of the voltage associated with the one or more output devices exceeds the overload threshold voltage.

22. The security system according to claim 20, wherein the overload threshold voltage corresponds with overloading conditions.

23. The method according to claim 20, wherein the output switch is an output transistor.

24. The method according to claim 20, wherein deactivating the one or more output devices comprises a protection switch rendering the output switch nonconductive.

25. The method according to claim 24, wherein the protection switch is a protection transistor.

* * * * *